(12) United States Patent
Rule et al.

(10) Patent No.: US 12,387,257 B2
(45) Date of Patent: *Aug. 12, 2025

(54) NFC ENHANCED AUGMENTED REALITY INFORMATION OVERLAYS

(71) Applicant: Capital One Services, LLC, McLean, VA (US)

(72) Inventors: Jeffrey Rule, Chevy Chase, MD (US); Kaitlin Newman, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,842

(22) Filed: May 15, 2024

(65) Prior Publication Data

US 2024/0303721 A1 Sep. 12, 2024

Related U.S. Application Data

(63) Continuation of application No. 18/196,122, filed on May 11, 2023, now Pat. No. 12,020,312, which is a
(Continued)

(51) Int. Cl.
| | |
|---|---|
| *G06Q 30/0601* | (2023.01) |
| *G06K 7/10* | (2006.01) |
| *G06Q 20/34* | (2012.01) |
| *G06Q 20/38* | (2012.01) |
| *G06Q 20/40* | (2012.01) |

(Continued)

(52) U.S. Cl.
CPC ..... *G06Q 30/0643* (2013.01); *G06K 7/10297* (2013.01); *G06Q 20/341* (2013.01); *G06Q 20/352* (2013.01); *G06Q 20/3829* (2013.01); *G06Q 20/4018* (2013.01); *G06Q 30/0282* (2013.01); *G06T 11/60* (2013.01); *G06Q 2220/00* (2013.01)

(58) Field of Classification Search
CPC ............... G06Q 20/341; G06Q 20/352; G06Q 20/3829; G06Q 2220/00; G06Q 30/0643; G06Q 30/0282; G06Q 20/4018; G06K 7/10297; G06T 11/60
USPC ......................................................... 705/71
See application file for complete search history.

(56) References Cited

U.S. PATENT DOCUMENTS 10,482,664 B1 * 11/2019 Schlosser ........... G06Q 20/3224
2014/0100991 A1 4/2014 Lenahan et al.
(Continued)

FOREIGN PATENT DOCUMENTS

| | | |
|---|---|---|
| CN | 108388637 A | 8/2018 |
| JP | 2006048517 A | 2/2006 |

(Continued)

*Primary Examiner* — Courtney P Jones
(74) *Attorney, Agent, or Firm* — KDW FIRM PLLC

(57) ABSTRACT

Various embodiments are directed to overlaying relevant product information in augmented reality via the use of near-field communication (NFC) and a product selection system. A user may authenticate into an application or user profile. Information about the user in the user profile may be used to determine which products are relevant to the user. Information related to the relevant products may then be displayed to the user in augmented reality, which improves at least the overall shopping and in-store experience.

20 Claims, 10 Drawing Sheets

Related U.S. Application Data continuation of application No. 17/966,053, filed on Oct. 14, 2022, now Pat. No. 11,687,998, which is a continuation of application No. 16/423,482, filed on May 28, 2019, now Pat. No. 11,521,262.

(51) Int. Cl.
  *G06Q 30/0282* (2023.01)
  *G06T 11/60* (2006.01)

(56) References Cited

U.S. PATENT DOCUMENTS

| | | |
|---|---|---|
| 2014/0286491 A1 | 9/2014 | Atherton |
| 2016/0026253 A1 | 1/2016 | Bradski et al. |
| 2019/0244436 A1* | 8/2019 | Stansell ............ G06Q 30/0643 |
| 2019/0251561 A1* | 8/2019 | Oosthuizen .............. G07F 7/10 |

FOREIGN PATENT DOCUMENTS

| | | |
|---|---|---|
| JP | 2018518778 A | 7/2018 |
| JP | 2019050021 A | 3/2019 |
| WO | 03071735 A1 | 8/2003 |

* cited by examiner

100

*102*

NFC ENHANCED AUGMENTED REALITY INFORMATION OVERLAYS

CROSS-REFERENCE TO RELATED APPLICATIONS

This application is a continuation of U.S. patent application Ser. No. 18/196,122, filed May 11, 2023, which is a continuation of U.S. patent application Ser. No. 17/966,053, filed Oct. 14, 2022, now U.S. Pat. No. 11,687,998, which is a continuation of U.S. patent application Ser. No. 16/423,482, filed May 28, 2019, now U.S. Pat. No. 11,521,262, all of which are incorporated herein by reference in their entirety.

BACKGROUND

For customers, shopping online may offer certain advantages over shopping in a store. For example, online customers may be able to read various product reviews, read numerous user comments, view specification sheets, view images or videos of products outside of their packaging, etc. prior to purchasing a product. For in-store customers, however, product-related information, such as reviews, comments, or the like may not be readily available unless the customers perform online searches of every product they wish to purchase, which may be a tedious and time-consuming task.

SUMMARY

Various embodiments are directed to overlaying relevant product information in augmented reality via the use of near-field communication (NFC) and a product selection system. A user may authenticate into an application or user profile. Information about the user in the user profile may be used to determine which products are relevant to the user. Information related to the relevant products may then be displayed to the user in augmented reality, which improves at least the overall shopping and in-store experience.

DETAILED DESCRIPTION

Figure 1A:
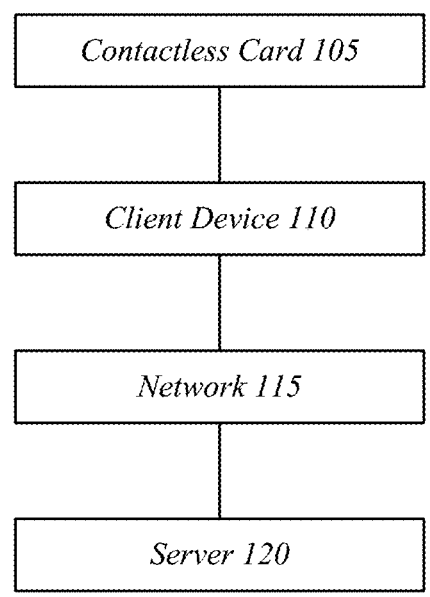
FIG. 1A illustrates an example data transmission system in accordance with one or more embodiments.

Various embodiments are generally directed to authenticating a user via a contactless near-field communication (NFC) smartcard, and based on the NFC authentication, overlaying virtual user-relevant, product-related information adjacent to one or more products in augmented reality (AR). In examples, the NFC authentication may provide the user a personalized in-store shopping experience. For instance, a shopping profile associated with the user may be accessed upon NFC authentication. Information associated with or contained in the shopping profile may be used to present in AR product-related information that is relevant to the user. Information that may be relevant to the user, for example, may include any product corresponding to the user's general shopping interests, shopping patterns, budgetary constraints, affinities toward specific types of sales, dietary restrictions, or the like.

According to embodiments, prior to or upon entering a store (e.g., a grocery store), the user may tap the user's contactless NFC card to a mobile computing device, such as a smartphone, a wearable computer, etc., to authenticate the user into an application and access the user's personal shopping profile. As will be further described below, this process may be referred to as "one-tap" authentication. The personal shopping profile may include various information related to the shopping preferences of the user, e.g., items previously purchased by the user, grocery lists previously created by the user, user-related diet plans, user-related dietary constraints, etc.

As the user moves within the store, for example, a user computing device may detect one or more NFC and/or RFID signals, and via these detected signals, the computing device may receive information corresponding to various types of products. In examples, the information from the detected signals may be analyzed so as to present only information relevant to the user. For instance, if the user is allergic to peanut butter, information related to peanut butter products may be filtered out and not displayed. As will be further described below, the product-related information may include at least in-store customer reviews, external customer reviews, in-store customer comments, external customer comments, information related to product safety, and so on.

The product information may be presented to the user in virtual information bubbles, which may be displayed on the user mobile computing device and float in an AR space so that they are persistently in close spatial association with the corresponding products or items in the store. In embodiments, the virtual information bubbles may be color coded based on semantic analysis to give a broad overview of positive and negative reviews, e.g., red may indicate a negative review, green may indicate a positive review. At a distance, color may the only feature of the information bubble visible to the user. As the user approaches a specific product, one or more headlines of the information bubble may come into view, and when the user gets even closer to the product, the customer may be able to read the entire content of the information bubble.

In examples, if the user desires to focus on a specific product and ignore the other displayed information bubbles, the user may tap the user mobile computing device on a product-specific NFC and/or RFID sensor located on or near the product. In other examples, a bar code of a specific product may be scanned.

In further examples, review and comments related to a product may be pulled from both in-store reviews from a specific store and web-based reviews of that product. The AR interface may allow these reviews and/or comments to be filtered and sorted. Moreover, if a user desires to review a particular product, the user may tap the user's contactless card onto the user mobile computing device to authenticate into an application, which may allow the user to quickly enter a comment or review without having to manually log into the application (which the user can still do).

The term "information bubble" used herein to describe how the product information is graphically displayed in AR may be understood to broadly mean any suitable manner in displaying the product information, e.g., text-only, bubble-shaped graphic, square-shaped graphic, rectangular-shaped graphic, various fonts, sizes, colors, etc.

In previous solutions, product-related information was not readily available to customers when shopping in brick-and-mortar stores. As described above, one way a customer could obtain product information in the store was to look up each and every product online, but that process was a tedious and overly cumbersome task. Moreover, the in-store shopping experience was not meaningfully personalized to each customer. The embodiments and examples described herein overcome and are advantageous over the previous solutions in that product-related information that is relevant to the user is provided in AR during the in-store shopping experience. In at least that regard, personalized, product-related information may be readily available to the user, which significantly improves the overall shopping experience.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components; system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example, from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access (CDMA) based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to the memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
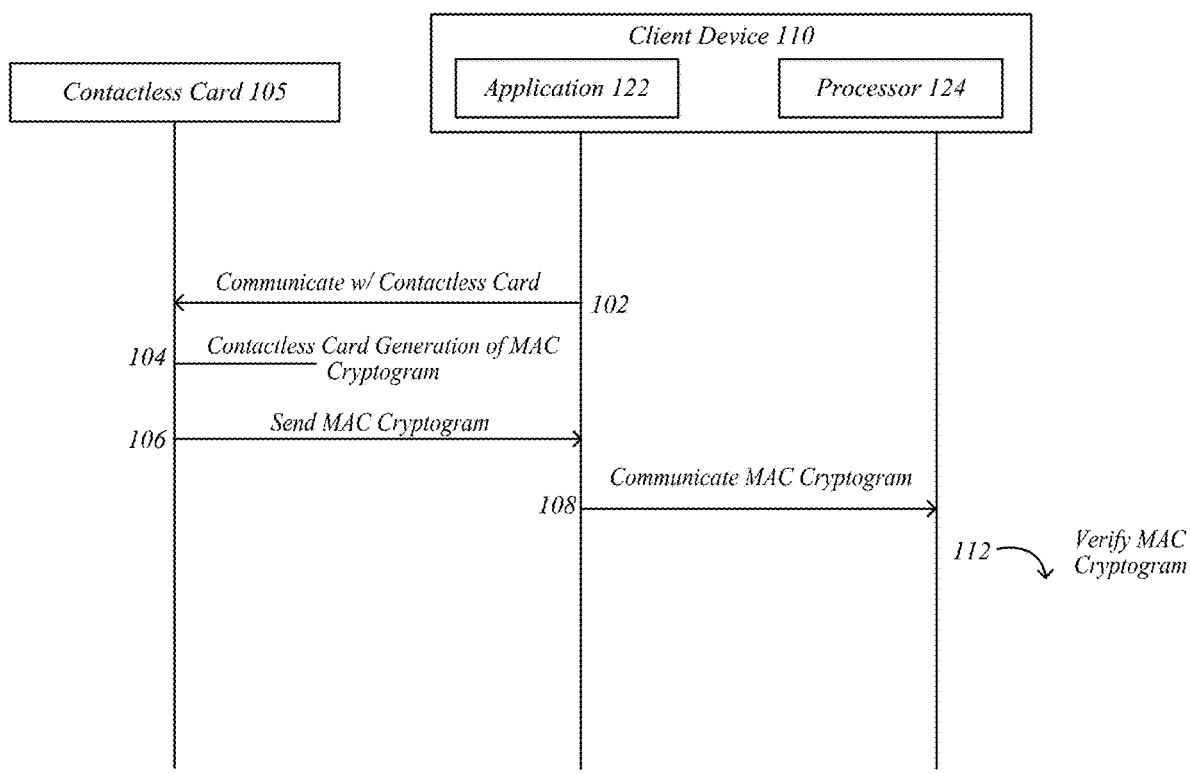
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples, the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC. However, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
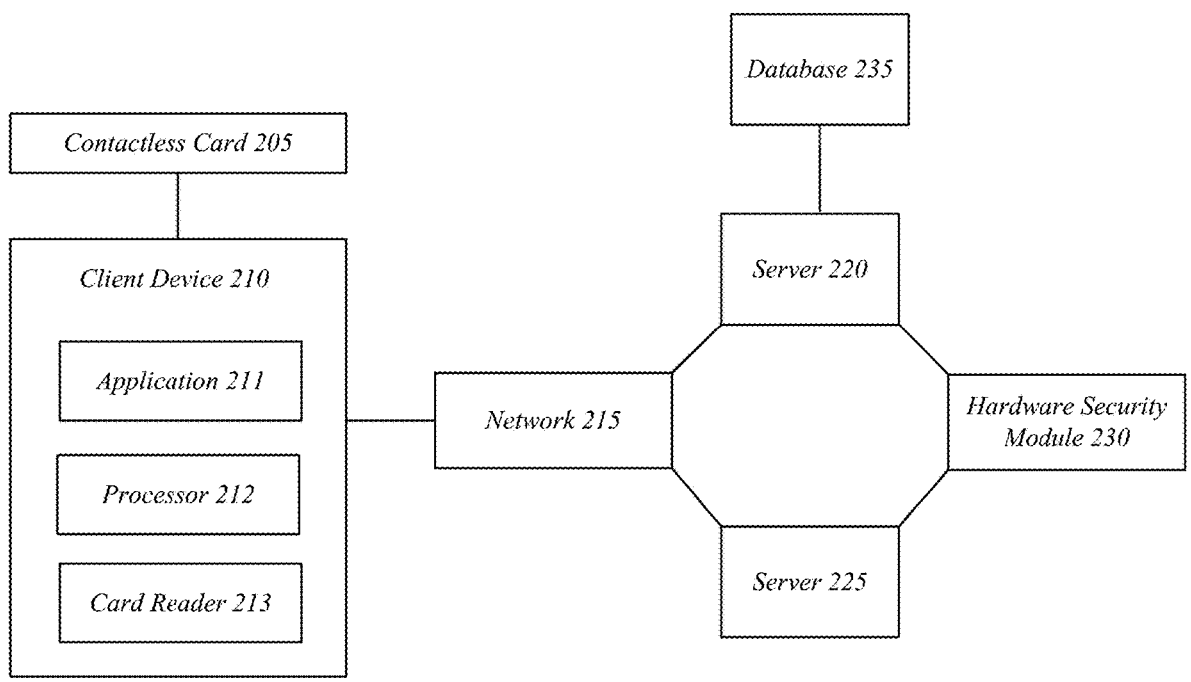
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example, NFC communication, with client device 210. For example, contactless card 205 may include one or more chips, such as a radio frequency identification chip, configured to communicate via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when the contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead, are maintained within the HSM 230. For example, one or more HSMs 230 may be configured to perform at least one of key derivations, decryption, and MAC operations. The one or more HSMs 230 may be contained within or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based (CDMA) systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC communication, the cellular network between client device 210 and a carrier, and Internet between the carrier and a back-end.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211 and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with the contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
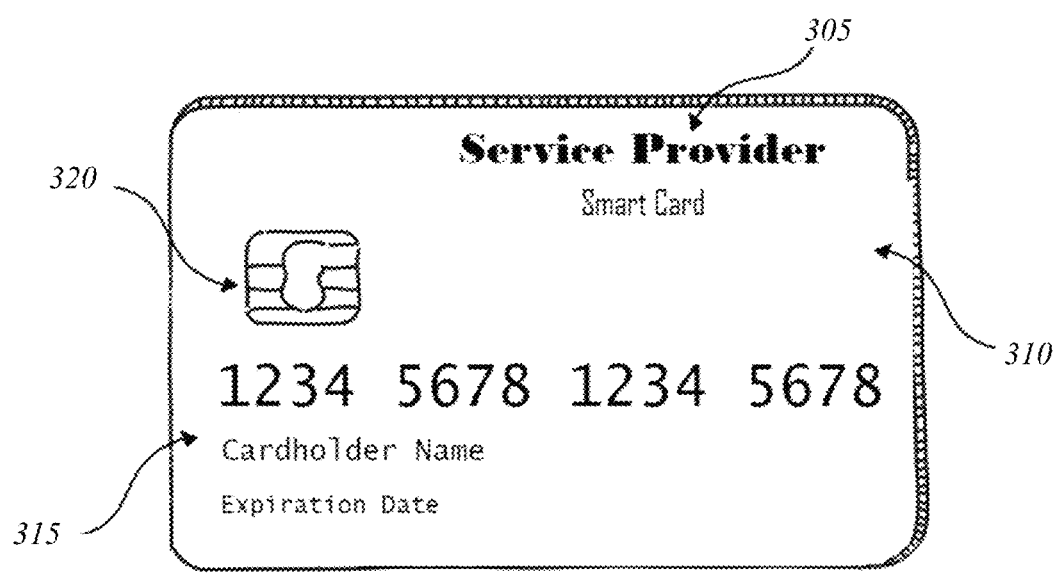
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card and may include, without limitation, an identification card. In some examples, the payment card may include a dual interface contactless payment card. The contactless card 300 may include a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
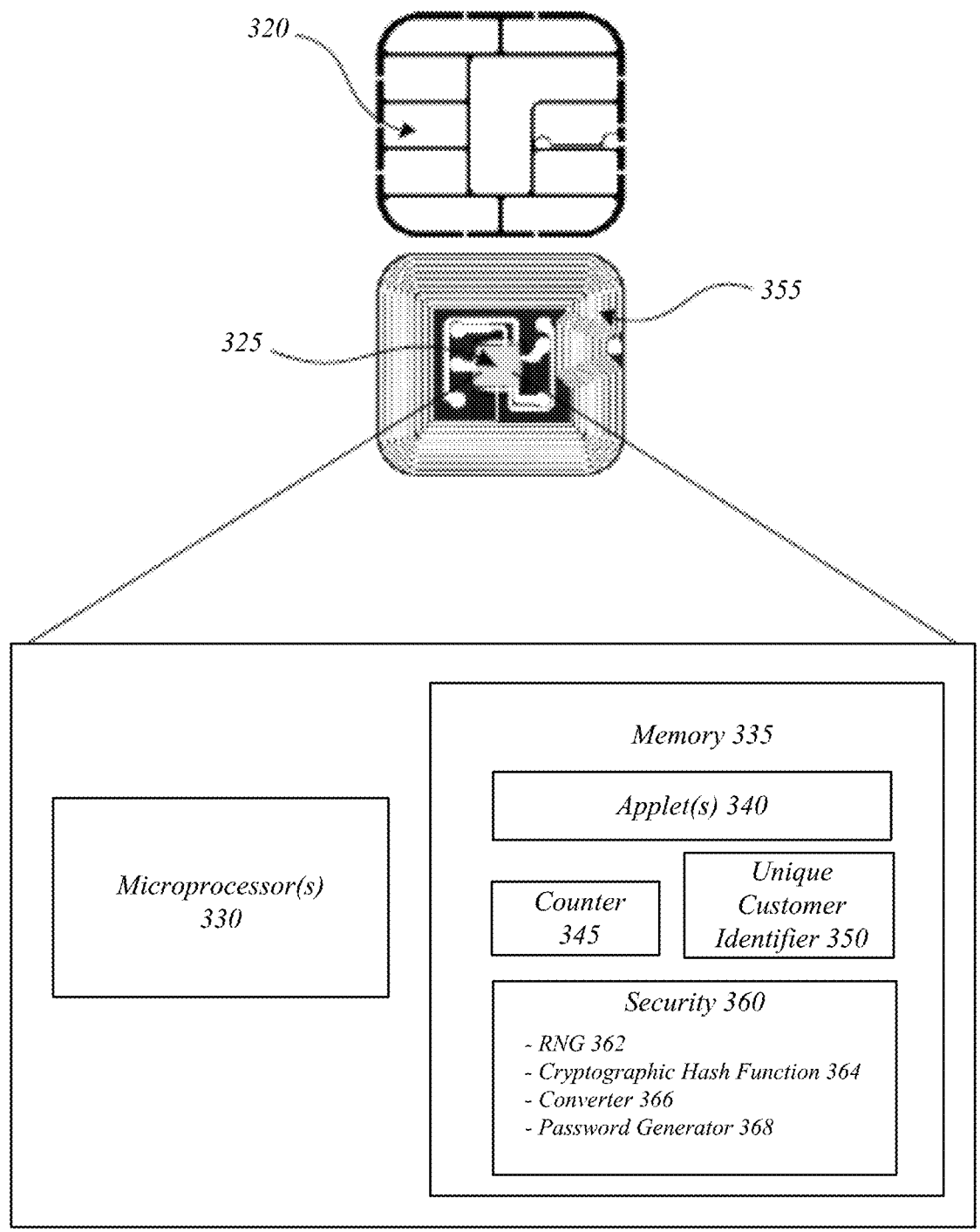
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 335 may be configured to store one or more applets 340, one or more counters 345, and a customer identifier 350. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

Figure 4:
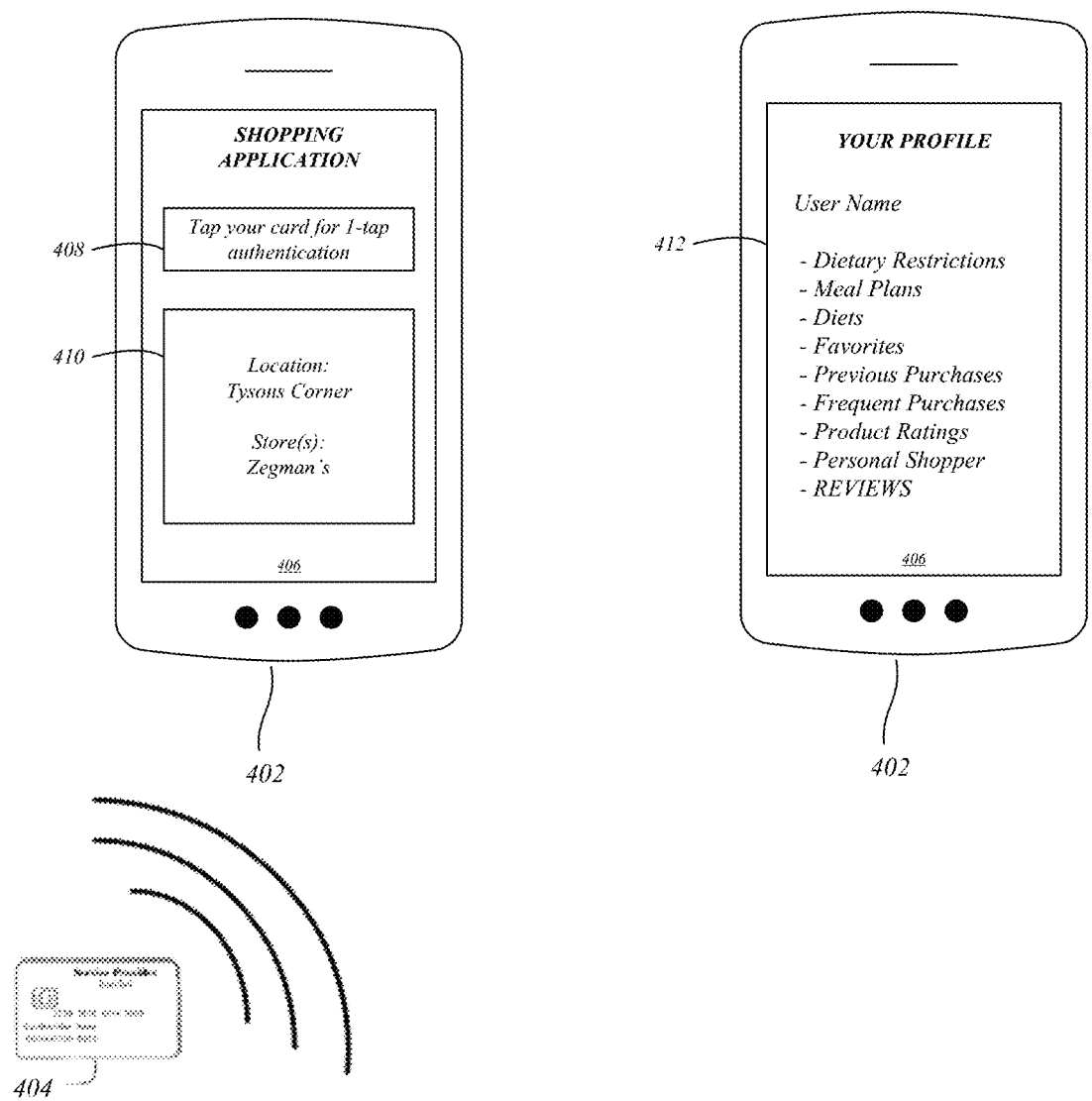
FIG. 4 illustrates an example sequence diagram relating to secure password generation in accordance with one or more embodiments.

FIG. 4 illustrates an example one-tap authentication using a contactless card according to one or more embodiments. As shown, a mobile computing device 402 may be a user or client device (which may also be referred to as a user computing device), such as a smartphone, wearable computer, etc. configured to communicate with a contactless card 404. As described above, the mobile computing device 402 may include at least an NFC card reader configured to establish NFC communication with the contactless card 404 via an NFC reader coil. It may be understood that the contactless card 404 may be similar or identical to the contactless card 300 described above.

In examples, a shopping application executing on the mobile computing device 402 may display a graphical user interface (GUI) module 406 to perform one-tap authentication, AR display, and in some example, one-tap payment. A notification 408 may instruct the user to tap the contactless card 404 to the mobile computing device 402 to authenticate into the shopping application. Moreover, in embodiments, a global positioning system (GPS) feature or graphic 410 may display the current location of the computing device 402 (e.g., Tysons Corner) and may further display the closest store(s) within a predefined area of the current location.

Upon the user tapping the contactless card 404 to the mobile computing device 402, the contactless card 404 may generate encrypted data and transmit the same to the computing device 404. Once received, the one-tap GUI module 406 may transmit at least the encrypted data to an authentication server, which may decrypt the data and verify the data with a private key stored in the memory of the server. The authentication server may then authenticate the user of the contactless card 404 and send the mobile computing device 402 confirmation thereof. Thereafter, the one-tap GUI module 406 may display a profile 412 and various other information related to the user.

As illustrated, the user profile 412 may display one or more of the following information: the user's name, the user's dietary restrictions (if any), various meal plans that the user may be on (e.g., budget meal plans, protein-based meal plans), diets that the user may be on (e.g., no-carb diet, fruit-and-vegetable diet), various user favorites (e.g., favorite snacks, favorite seasonal fruits, favorite proteins, etc.), previous user purchases (e.g., a list of previously purchased products within a predefined time period), a list of frequently purchased items, preferences on product ratings (e.g., whether the user prefers only three-star rated products and up), any linkable personal shopper systems (e.g., automated shopping assistance devices), and a link for reviews (e.g., a platform that allows the user to give or provide reviews). It may be understood that each of the foregoing user-specific information can be interactively selectable by the user (directing the user to a separate GUI or page) and may allow the user to customize any related information.

In further examples, while shopping or perusing in a store, one-tap authentication may allow a user to quickly and efficiently open the shopping application with a single tap of the contactless card 404 and enter review(s) of a product. In addition to one-tap authentication, in some examples, a user may be able to perform one-tap payment of certain products.

For example, when the contactless card 404 is tapped to the mobile computing device 402, a merchant ID and a transaction ID may be sent to the authentication server. A virtual account number (VAN) generator may be used to generate virtual card data (e.g., a virtual card number, expiration date, and/or CVV) associated with the contactless card 404. The VAN generator may then transmit the virtual card data, the merchant ID, transaction ID, and any usernames and/or addresses corresponding to the user to one or more merchant servers (for example, the merchant server(s) may be associated with the store that the user is currently shopping in). The merchant server may then process the transaction using the data received from the VAN generator, e.g., by generating a transaction record in a transaction database using at least the received virtual card number, expiration date, CVV, etc. The transaction record may further include the user's name, billing address, shipping address, and an indication of each item and/or service purchased. The merchant server may then transmit an order confirmation to the mobile computing device 404. Thus, for example, if the user picks out various items to purchase, but wishes to purchase the items with one-tap payment (as opposed to paying for the items in a check-out line), the user may tap the contactless card 404, arrange delivery of the items (either in-store or via the shopping application), and walk out of the store.

Figure 5:
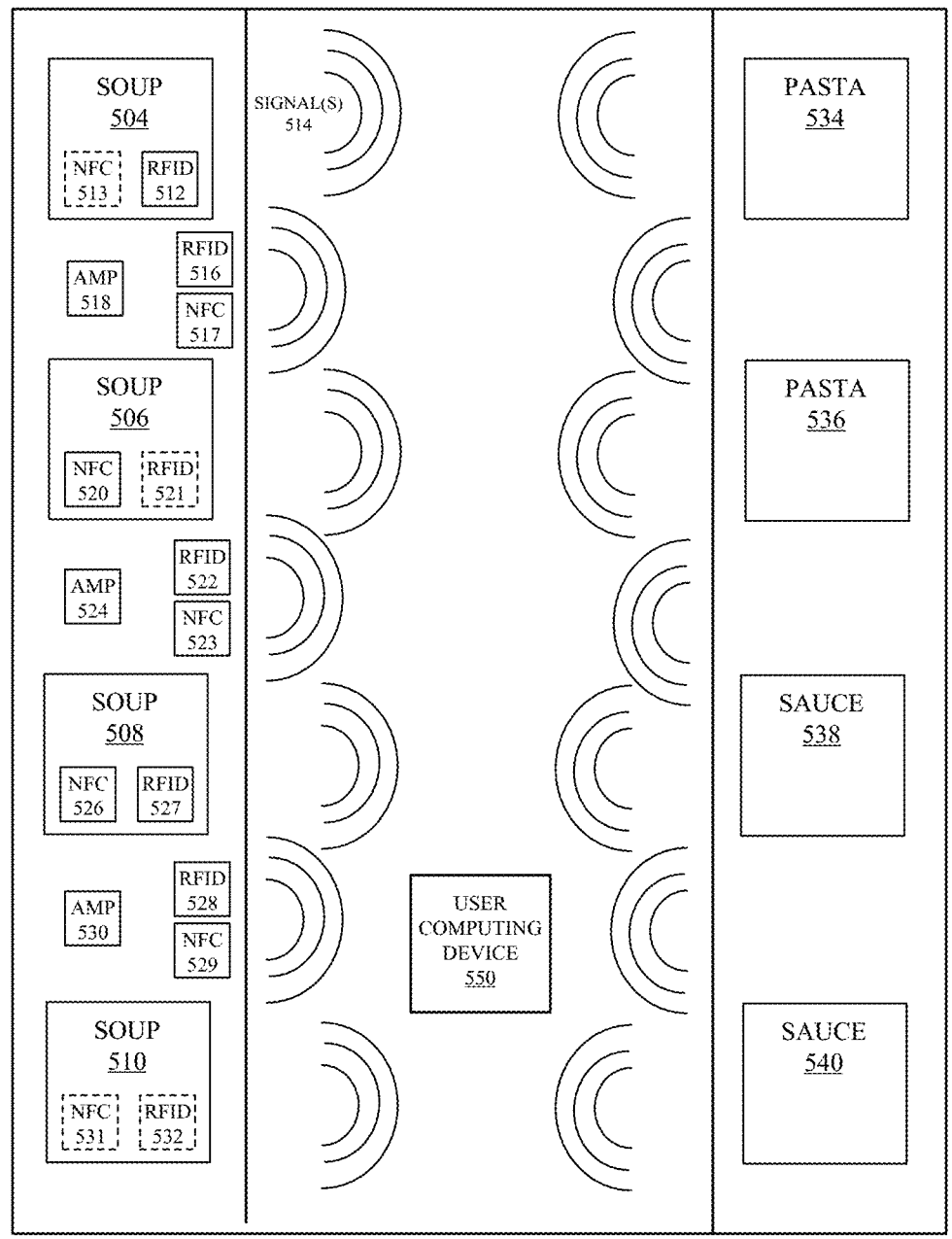
FIG. 5 illustrates an example password generation for a password manager application in accordance with one or more embodiments.

FIG. 5 illustrates example NFC and RFID signals according to one or more embodiments. By way of example, various products may be stocked and displayed along each side of a grocery store aisle. As shown, on one side of aisle 502, various soups may be stocked and displayed, e.g., soup 504, 506, 508, 510. On the other side of the aisle 502, various pasta-related items may be stocked and displayed, e.g., pasta 534, 536, pasta sauce 538, 540. Information related to these products may be transmitted via signals emitted from one or more NFC and/or RFID tags or sensors.

In examples, the tags or sensors may be located on the products themselves or may be arranged near or adjacent to the products, or both. As illustrated, an RFID tag 512 may be arranged on soup 504. Optionally, an NFC tag 513 may be arranged on the soup 504, as indicated by the dashed outline. As will be further described below, one or more signal(s) 514 from the RFID tag 512 (or the NFC tag 513) may be detected by an RFID (or NFC) reader of a user computing device 550, such as a user mobile computing device (e.g., smartphone, wearable computer, tablet, etc.). In some examples, one or more RFID or NFC tags may be placed or arranged next to the soup 504, such as RFID tag 516 and NFC tag 517, which may provide information not only on soup 504, but also on soup 506 (or any other products that may be stocked and displayed nearby).

To increase the signal strength from the tags, a signal amplifier, such as amplifier 518, may be arranged adjacent to or coupled with any of the RFID tags 512, 516 and/or NFC tags 513, 517. By increasing the signal strength, the one or more NFC or RFID signals from the sensors 512, 513, 516, 517 may be detected by a computing device further away, for example, at the other end of the aisle 502.

As further shown, an NFC tag 520 may be arranged on soup 506, and optionally, an RFID tag 521 may also be arranged thereon. Similar to the arrangement of RFID tag 516, NFC tag 517, and signal amplifier 518, an RFID tag 522, NFC tag 523, and signal simplifier 524 may also be arranged adjacent to soup 506. Signal(s) from the RFID tag 522 and NFC tag 523 may include information about not only soup 506, but also about soup 508 (and other adjacent products).

Soup 508 may be different from soup 504 and 506 in that it may have both an NFC tag 526 and an RFID tag 527 arranged thereon, as indicated by the solid lines. Whereas, for soup 510, NFC tag 531 and RFID tag 532 may both be optional, as shown by the dashed lines. Moreover, signals from RFID tag 528 and NFC 529 may include information about soups 508 and 510 (or any other nearby products) and amplified by signal amplifier 530.

According to embodiments, one or more NFC tags, RFID tags, and/or signal amplifiers may be configured on pasta side of the aisle 502 similarly to the soup side of the aisle. As shown, pastas 534, 536 and sauces 538, 540 may be stocked and displayed on the pasta side. In at least that regard, signals from the NFC tags and/or RFID tags arranged on the pasta products may transmit product-related information, which may be detected by the user computing device 550.

While FIG. 5 illustrates NFC and/or RFID tags arranged on both the products and adjacent to the products, it may be understood that any suitable arrangement the tags is possible, e.g., tags may be arranged only on the products, tags may be arranged only adjacent to the products, as long as the product-related information can be sent to the user computing device 550. Moreover, it may be understood that the signal amplifiers may be configured in any suitable way to enhance the reach and coverage of the signals from the NFC and/or RFID tags.

Figure 6:
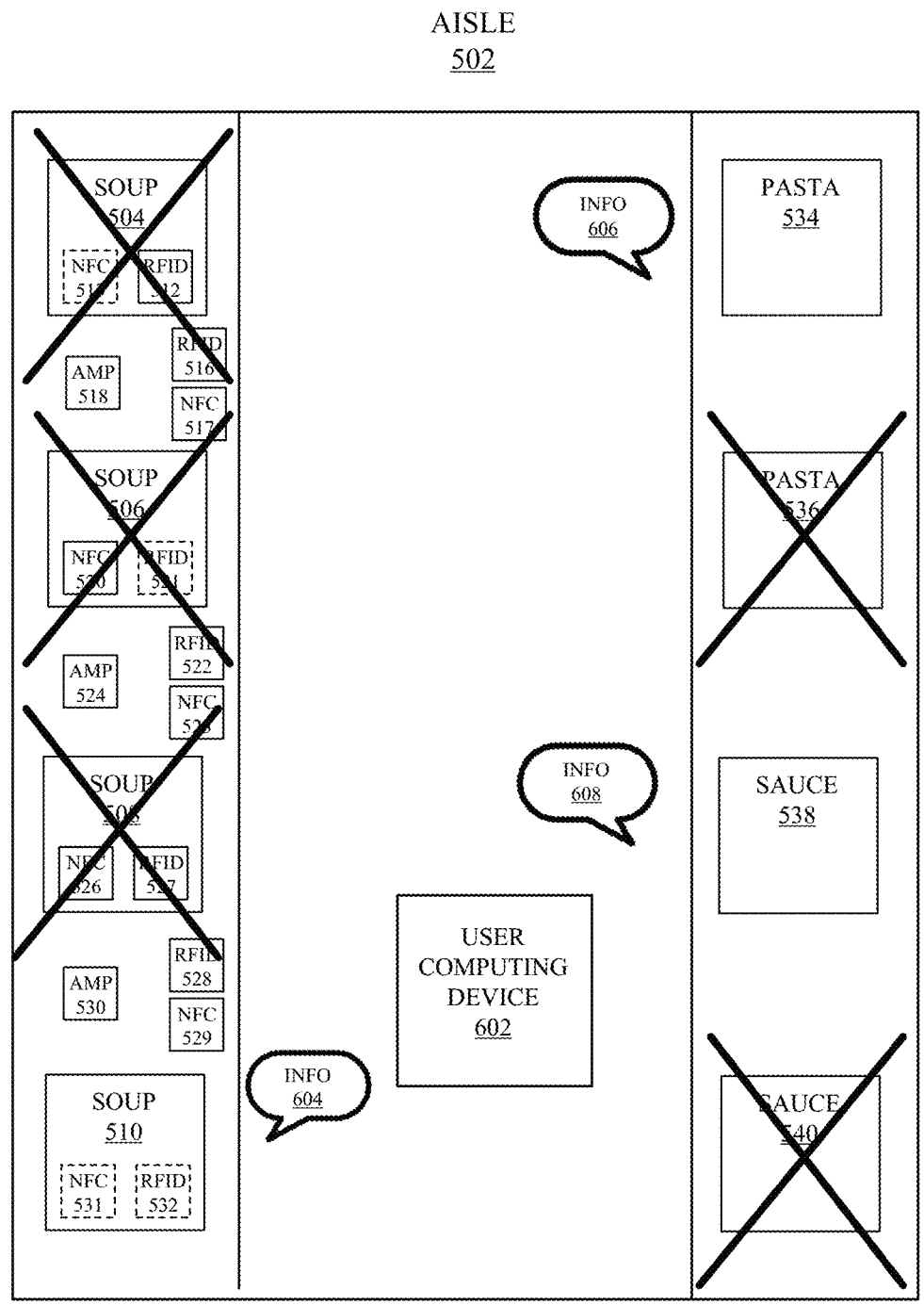
FIG. 6 illustrates another example of a sequence diagram relating to secure password generation in accordance with one or more embodiments.

FIG. 6 illustrates an example filtration process 600 of product-related information based on a user profile according to one or more embodiments. For ease of explanation, at least the products (e.g., soup, pasta, sauce) on each side of aisle 502 illustrated in FIG. 5 will be used in FIG. 6 to describe the filtration process 600.

As a user moves through or walks down the aisle 502, a user computing device 602, which belongs to the user, may detect numerous signals from the NFC and/or RFID tags arranged on and/or adjacent to the products. In examples, an NFC reader configured in the user computing device 602 may detect all of the NFC signals from the NFC tags. In further examples, an RFID reader configured in the user computing device 602 may detect all of the RFID signals from the RFID tags. The RFID reader, for instance, may be a passive ultra-high frequency (UHF) RFID reader.

Upon receiving the product-related information via the detected signals, the user computing device 602 may filter out any information that may be irrelevant to the user. For example, the user shopping profile may indicate specific ingredients that the user may be allergic to (or fall under a dietary restriction). If soups 504, 506, and 508 contain those ingredients, then product-related information associated with the soups 504, 506, and 508 are not displayed in AR, as indicated by the cross outs. In another example, the user shopping profile may indicate that the user is on a budget plan and prefers not to spend more than a predetermined amount on specific items. If soups 504, 506, and 508 exceed the specified amount, then the product-related information corresponding to soups 504, 506, and 508 are not displayed in AR. Relevancy may be understood to refer to, or may be determined based on, how closely the products (or related information) match the various descriptions, indications, preferences, etc. specified in the user shopping profile. In examples, a degree of match may be determined, e.g., threshold matching—a predetermined or predefined level of similarly may be considered a match.

As illustrated, if a product is determined not to be irrelevant, such as soup 510, the user computing device 602 may display in AR the information associated with that product, such as information bubble 604. As will be further described below, information bubble 604 may include an in-store customer comment regarding the soup 510, e.g., "pairs well with a grilled cheese sandwich," "wait till the end of month for a deal, three for three dollars," "tasty," may include a star-based review, e.g., "four out of five stars," etc.

In some instances, one or more criteria may have to be met for the product-related information to be displayed. For example, the one or more criteria may include previously purchased products, products related to a meal plan set by the user, products comporting with a dietary restriction of the user, products allowed under a diet that the user may be on, products related to the user's favorite snacks, products related to the user's favorite seasonal fruits, products related to the user's favorite protein, discounted products or various specials on the products (which may be specified by the user), frequently purchased products by the user, products recommended by a personal shopper or shopping system associated with the user, products that meet a threshold product rating set by the user, etc. For example, soup 510 may be a product that comports with the user's dietary restriction and has a five-star product rating, which meets the user-set threshold rating of four stars.

As further shown, the similar filtration process may be applied on the pasta side of the aisle 502. For example, information related to pasta 536 and sauce 540 may be excluded (as indicated by the cross outs) from AR display because they may include ingredients that fall under dietary restriction(s), or in other examples, because they fall under a threshold product rating previously set by the user for pasta products. It may be determined that pasta 534 and sauce 538 are not irrelevant, and thus, information bubbles 606 and 608 associated therewith, respectively, may be displayed in AR. Similar to information bubble 604, information bubbles 606 and 608 may include in-store customer comments and/or customer reviews. For example, information 608 may include a comment that states, "pairs well with angel hair."

Moreover, information bubbles may be considered relevant when at least the information contained therein is related to or based on a history or a pattern of purchases or financial transactions that are unique to the user and made by the user via the contactless card. For example, if the user purchases Greek yogurt every time, then yogurt products may be relevant to the user. In another example, if it is determined that the user prefers to purchase discounted or store-brand products based on the user's financial transactions, then discounted or store-brand products may be more relevant than other brands. In further examples, the user may selectively view comments and/or reviews of a product by scanning a barcode of that product.

Figure 7:
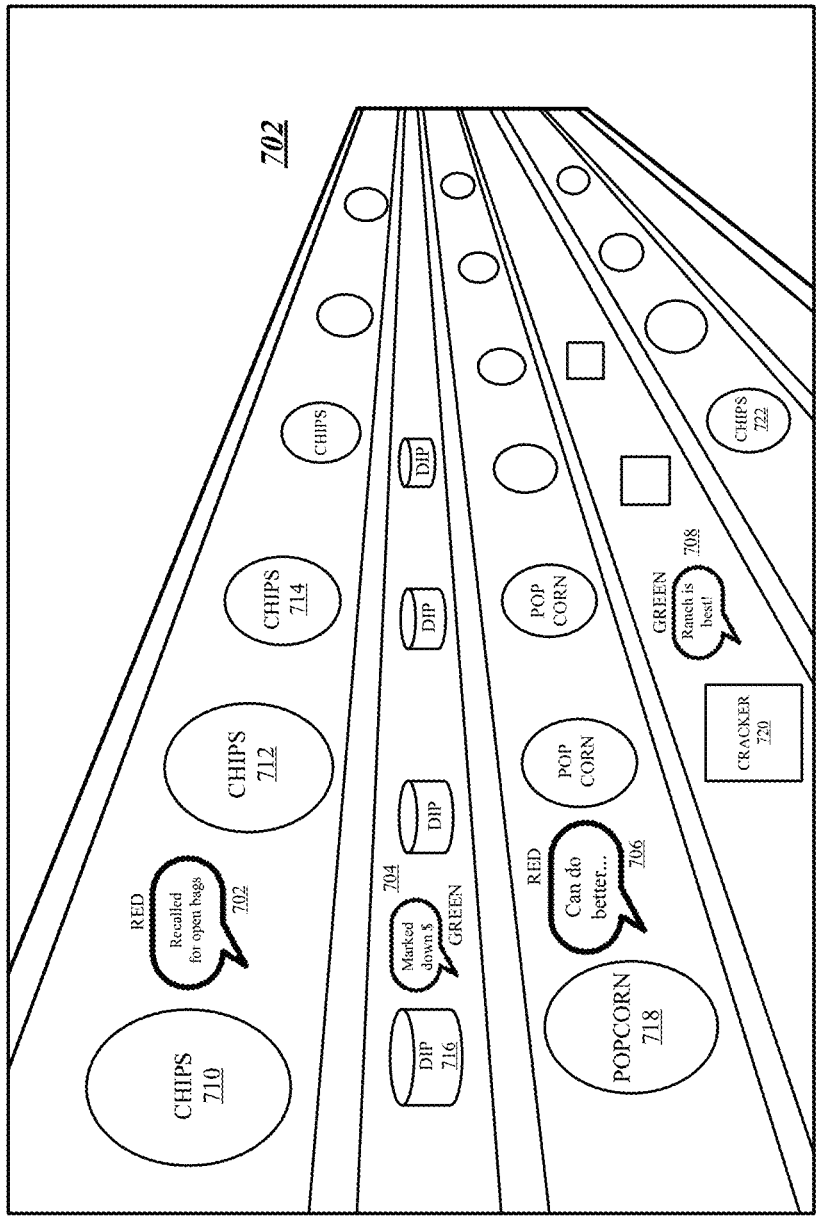
FIG. 7 illustrates another example of password generation for a website in accordance with one or more embodiments.

FIG. 7 illustrates example information bubbles displayed in AR space 700 according to one or more embodiments. As described above, an information bubble may include one or more types of information related to a product, such as a product identification number (e.g., a unique, searchable number), in-store customer reviews, in-store customer comments, in-store customer ratings, external customer reviews, external comments, and other types of external information. In examples, the external information may be web-based information, which may include web reviews, product specification sheets, web ratings, visual renderings or images of various items or components within the products such that the items or components are viewable in AR outside of the packaging of the products, etc. In some examples, the user computing device may retrieve or search for the external information upon obtaining the name of the product, product identification number, or any other information related to the product that can be searched on the Internet.

As shown in FIG. 7, four different information bubbles 702, 704, 706, and 708 may be displayed in AR via a user computing device (not shown). It may be understood that FIG. 7 is what the user may see on the display screen of the user computing device. The information bubbles may provide information one or more of the various products stocked on the "chips and snack" side of aisle 702, which may include chips 710, 712, 714, 722, dip 716, popcorn 718, cracker 720, and so on.

In examples, information bubble 702 may be displayed adjacent to chips 710, which may be an externally-retrieved comment and recites "Recalled for open bags." According to embodiments, comments, reviews, or information that are negative may be color-coded, e.g., in red. Thus, some or all portions of the information bubble 702 may be red to indicate that the information contained in the bubble is negative.

Comments, reviews, or information that are positive may also be color-coded, e.g., in green. For example, information bubble 704 may be positioned in AR adjacent to dip 716 and may be an in-store comment or review (provided by the store or an in-store customer), which states "Marked down $." Thus, some or all portions of the information bubble 704 may be green to indicate positive information. It may be understood that what might be negative or positive may be relative and/or specific to the user, e.g., it may be possible that what is positive for one user may be negative for a different user.

As further shown in FIG. 7, information bubble 706 may be positioned adjacent to popcorn 718, which is an in-store customer comment or review reciting "can do better." In examples, if there are multiple comments of the same product, e.g., popcorn 718, the user computing device may rank each of the comments based on the user's specific preferences. If popcorn is a product that the user always purchases, then a comment that includes an alternative suggestion would be highly ranked, for instance, a comment that may recite, "The other popular popcorn brand is better." Since the information contained in bubble 706 is negative, again, some or all portions of the bubble may be color-coded in red.

Moreover, information bubble 708 may be displayed or positioned in AR adjacent to cracker 720 and may be an external web review indicating that the ranch flavor is the best flavor. Similar to bubble 704, information bubble 708 may be color-coded in green since it contains positive information.

Figure 8:
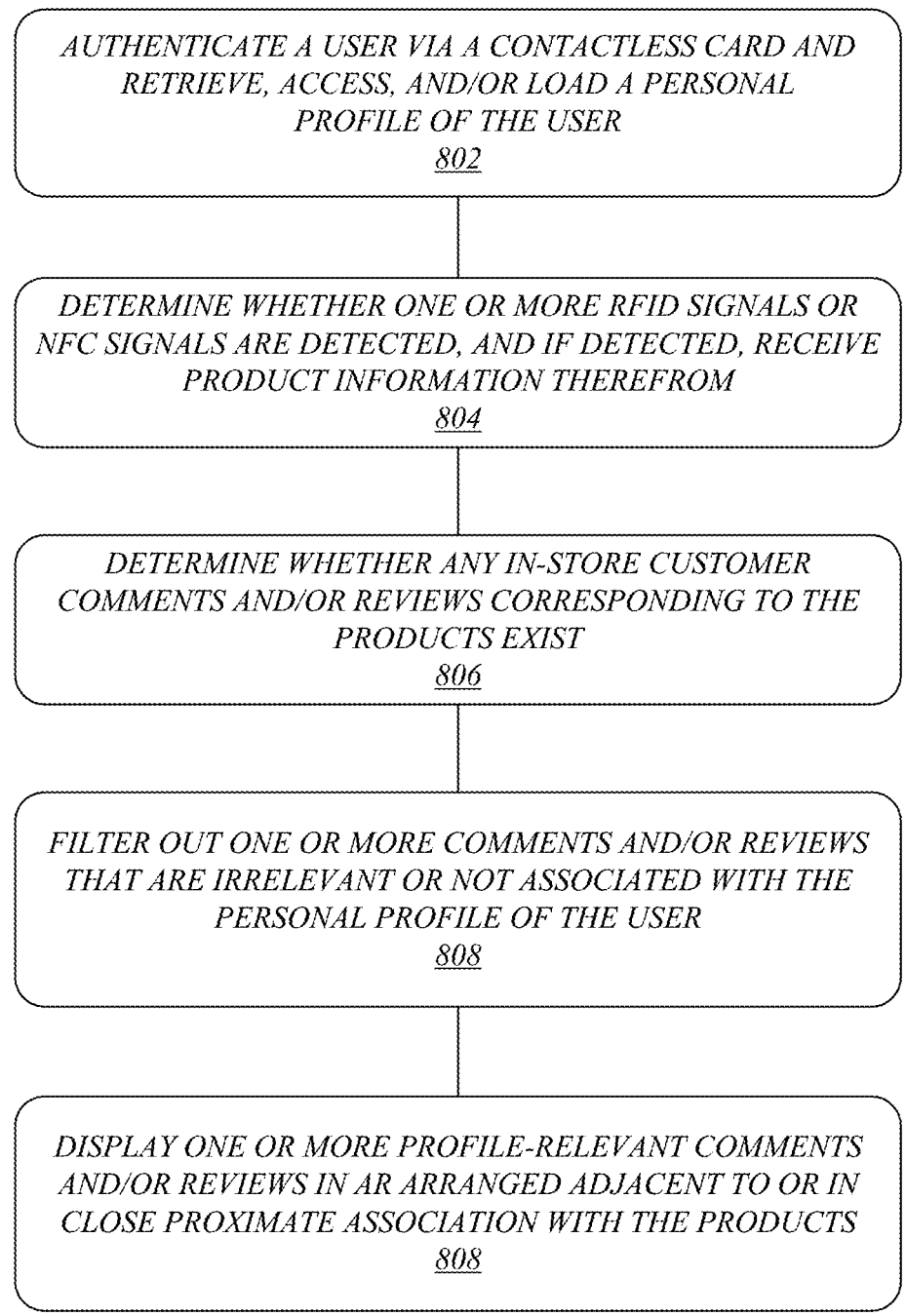
FIG. 8 illustrates an example flow diagram in accordance with one or more embodiments.

FIG. 8 illustrates an example flow diagram 800 according to one or more embodiments. It may be understood that the features associated with the illustrated blocks may be performed or executed by one or more computing devices, e.g., a mobile computing device, and/or processing circuitry contained therein. Moreover, it may be understood that the blocks in flow diagram 800 are not limited to any specific order, and the one or more blocks may be performed or executed simultaneously.

At block 802, a user may be authenticated into a shopping application via a contactless card, e.g., tapping the contactless card to the user's mobile computing device. Upon authentication, the mobile computing device may retrieve, access, and/or load a personal profile of the user. As described above, the personal profile may indicate various types of information about the user and the user's preferences, e.g., dietary restrictions, preferred meal plans, diets, favorites, previous purchases, frequent purchases, product rating preferences, personal shopper settings, reviews given, etc. Moreover, financial transaction data and transaction histories associated with the contactless card may be provided as part of the user's profile.

At block 804, the mobile computing device may determine whether one or more RFID and/or NFC signals are detected. If detected, product information from the detected RFID and/or NFC signals is received. As set forth above, RFID and/or NFC tags may be arranged on the products themselves and/or near the products. Signal amplifiers may be arranged along an aisle so as to amplify the signals from the RFID and/or NFC tags.

At block 806, it is determined whether any in-store customer comments and/or reviews corresponding to the detected products exist. The in-store customer comments may be provided by the customers shopping in that store and may be related to the product in any manner, e.g., product discounts, whether the product tastes good, what the product pairs well with when cooking, etc. It may be understood that external reviews, such as online reviews by online customers, related to the detected products may also be obtained.

At block 808, the mobile computing device may determine which of the in-store comments and/or reviews (or external reviews) are relevant to the user based on the user's profile. If the comments and/or reviews are not relevant to the user in any way, they are filtered out and not displayed to the user. In some examples, relevancy may be determined based on a relevancy score (e.g., percentage score). For instance, if comments and/or reviews mention a certain relevant product, but is not actually about that product, those comments and/or reviews may still be displayed even though they are not directly on point. Advantageously, the user's financial transaction data and history associated with the contactless card may also be used to determine relevancy. By way of example, if it is known that the user always purchases a dozen eggs on every shopping visit, then eggs will always be considered a relevant product.

At block 810, the profile-relevant comments and/or reviews may be displayed in AR to the user as information bubbles, which may be arranged adjacent to the relevant product or in close approximate association with the product. For example, even if the user moves around the object, the information bubble may appear to be stationary from the perspective of the user. Moreover, as described above, the user can selectively choose which products to focus on, for example, by scanning the product's barcode.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be used together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
   receiving, by a computing device, encrypted data from a contactless card;
   transmitting, by the device to an authentication server, the encrypted data;
   receiving, by the device from the authentication server, a confirmation specifying the authentication server decrypted the encrypted data;
   receiving, by the device from one or more one tags, product information associated with a plurality of products;
   launching, by the device based on the confirmation, an application including an augmented reality (AR) graphical user interface (GUI);
   determining, by the application, that the device has detected a first product of the plurality of products; and
   displaying, by the application in the AR GUI, the product information associated with the first product proximate to the first product.

2. The method of claim 1, wherein the determination that the device has detected the first product comprises one of: (i) determining the device has detected a near-field communication (NFC) tag associated with the first product, (ii) determining the device has detected a radio frequency identification (RFID) tag associated with the first product, and (iii) determining the device has scanned a barcode associated with the first product.

3. The method of claim 1, further comprising:
   accessing, by the device based on the confirmation, a personal profile associated with a user associated with the contactless card based at least in part on the confirmation; and
   determining, by the device based at least in part on the personal profile and the product information, whether each of the plurality of products are relevant or not relevant to the user.

4. The method of claim 3, wherein the product information comprises feedback corresponding to the plurality of products, wherein determining whether each of the plurality of products are relevant or not relevant to the user is based on:
   analyzing past financial transactions made by the user via the contactless card;
   determining one or more shopping patterns and one or more budget-related preferences in the analyzed financial transactions and whether the one or more shopping patterns and the one or more budget-related preferences relate to any of the plurality of products with the feedback;
   determining, based on the personal profile, whether there is a predetermined price not to be exceeded;
   determining, for each of the plurality of products, whether the product exceeds the predetermined price; and
   identifying the related feedback as profile-relevant.

5. The method of claim 3, wherein the personal profile comprises: (i) a dietary restriction of the user, (ii) a meal plan set by the user, (iii) a diet that the user is on, (iv) a favorite snack, (v) a favorite seasonal fruit, (vii) a budget plan, (viii) a list of products purchased during a predefined time period, (ix) a favorite protein, (x) a preference for a specific discounted product, (xi) a list of frequently purchased products, (xii) a personal shopper system linked by the user, and (xiii) a product rating preference set by the user.

6. The method of claim 1, further comprising prior to determining that the device has detected the first product:
   receiving, via the device, web-based information corresponding to the plurality of products based at least in part on the received product information, wherein the web-based information comprises images of items in each of the plurality of products such that the items are viewable outside a packaging of each product; and overlaying, by the application, the web-based information comprising the images of the items and the relevant product information in the AR GUI proximate to the plurality of products.

7. The method of claim 6, wherein the overlaid product information are color coded in a first color to indicate a first type of information and in a second color different from the first color to indicate a second type of information different from the first type of information.

8. The method of claim 1, wherein the product information is received based on respective product information numbers for each product received from the tags, wherein the tags comprise near-field communication (NFC) tags or radio frequency identification (RFID) tags.

9. The method of claim 1, wherein the encrypted data comprises a message authentication code (MAC) cryptogram, wherein the confirmation is further based on the authentication server verifying the MAC cryptogram, wherein the verification is based on the MAC cryptogram as a digital signature.

10. A non-transitory computer-readable storage medium, the computer-readable storage medium including instructions that when executed by a processor of a device, cause the processor to:
receive encrypted data from a contactless card;
transmit the encrypted data to an authentication server;
receive, from the authentication server, a confirmation specifying the authentication server decrypted the encrypted data;
receive, from one or more one tags, product information associated with a plurality of products;
launch, based on the confirmation, an application including an augmented reality (AR) graphical user interface (GUI);
determine, by the application, that the device has detected a first product of the plurality of products; and
display, by the application in the AR GUI, the product information associated with the first product proximate to the first product.

11. The computer-readable storage medium of claim 10, wherein the determination that the device has detected the first product comprises one of: (i) determining the device has detected a near-field communication (NFC) tag associated with the first product, (ii) determining the device has detected a radio frequency identification (RFID) tag associated with the first product, and (iii) determining the device has scanned a barcode associated with the first product.

12. The computer-readable storage medium of claim 10, wherein the instructions further cause the processor to:
access, based on the confirmation, a personal profile associated with a user associated with the contactless card based at least in part on the confirmation; and
determine, based at least in part on the personal profile and the product information, whether each of the plurality of products are relevant or not relevant to the user.

13. The computer-readable storage medium of claim 10, wherein the instructions further cause the processor to prior to determining that the device has detected the first product:
receive web-based information corresponding to the plurality of products based at least in part on the received product information, wherein the web-based information comprises images of items in each of the plurality of products such that the items are viewable outside a packaging of each product; and
overlay, by the application, the web-based information comprising the images of the items and the relevant product information in the AR GUI proximate to the plurality of products.

14. The computer-readable storage medium of claim 10, wherein the product information is received based on respective product information numbers for each product received from the tags, wherein the tags comprise near-field communication (NFC) tags or radio frequency identification (RFID) tags.

15. The computer-readable storage medium of claim 10, wherein the encrypted data comprises a message authentication code (MAC) cryptogram, wherein the confirmation is further based on the authentication server verifying the MAC cryptogram, wherein the verification is based on the MAC cryptogram as a digital signature.

16. A computing apparatus comprising:
a processor; and
a memory storing instructions that, when executed by the processor, cause the processor to:
receive encrypted data from a contactless card;
transmit the encrypted data to an authentication server;
receive, from the authentication server, a confirmation specifying the authentication server decrypted the encrypted data;
receive, from one or more one tags, product information associated with a plurality of products;
launch, based on the confirmation, an application including an augmented reality (AR) graphical user interface (GUI);
determine, by the application, that the apparatus has detected a first product of the plurality of products; and
display, by the application in the AR GUI, the product information associated with the first product proximate to the first product.

17. The computing apparatus of claim 16, wherein the determination that the apparatus has detected the first product comprises one of: (i) determining the apparatus has detected a near-field communication (NFC) tag associated with the first product, (ii) determining the apparatus has detected a radio frequency identification (RFID) tag associated with the first product, and (iii) determining the apparatus has scanned a barcode associated with the first product.

18. The computing apparatus of claim 16, wherein the instructions further cause the processor to prior to determining that the apparatus has detected the first product:
receive web-based information corresponding to the plurality of products based at least in part on the received product information, wherein the web-based information comprises images of items in each of the plurality of products such that the items are viewable outside a packaging of each product; and
overlay, by the application, the web-based information comprising the images of the items and the relevant product information in the AR GUI proximate to the plurality of products.

19. The computing apparatus of claim 16, wherein the product information is received based on respective product information numbers for each product received from the tags, wherein the tags comprise near-field communication (NFC) tags or radio frequency identification (RFID) tags.

20. The computing apparatus of claim 16, wherein the encrypted data comprises a message authentication code (MAC) cryptogram, wherein the confirmation is further based on the authentication server verifying the MAC cryptogram, wherein the verification is based on the MAC cryptogram as a digital signature.

* * * * *